United States Patent
Furusawa et al.

(10) Patent No.: US 6,934,738 B1
(45) Date of Patent: Aug. 23, 2005

(54) MESSAGE PROCESSING APPARATUS

(75) Inventors: Toyoaki Furusawa, Kawasaki (JP); Haruhito Nagata, Kawasaki (JP); Toshihiro Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/522,584

(22) Filed: Mar. 10, 2000

(30) Foreign Application Priority Data

Jul. 22, 1999 (JP) ................................. 11-207308

(51) Int. Cl.$^7$ ............................................. G06F 15/16
(52) U.S. Cl. ...................... 709/206; 712/260; 710/244
(58) Field of Search ............................... 709/206, 202, 709/203, 207; 710/260; 712/208, 244

(56) References Cited

U.S. PATENT DOCUMENTS

| | | | |
|---|---|---|---|
| 5,826,101 A * | 10/1998 | Beck et al. | 712/34 |
| 5,956,521 A * | 9/1999 | Wang | 710/35 |
| 6,021,429 A * | 2/2000 | Danknick | 709/208 |
| 6,263,396 B1 * | 7/2001 | Cottle et al. | 710/263 |
| 6,301,710 B1 * | 10/2001 | Fujiwara | 717/175 |
| 6,304,914 B1 * | 10/2001 | Deo et al. | 709/247 |
| 6,446,192 B1 * | 9/2002 | Narasimhan et al. | 712/29 |
| 6,622,160 B1 * | 9/2003 | Horvitz | 709/206 |
| 6,662,232 B1 * | 12/2003 | Nicholls et al. | 709/246 |
| 6,732,156 B2 * | 5/2004 | Miloslavsky | 709/206 |

FOREIGN PATENT DOCUMENTS

| | | |
|---|---|---|
| JP | 09-223087 | 8/1997 |
| JP | 10-074176 | 3/1998 |
| JP | 10-177529 | 6/1998 |
| JP | 10260919 | 9/1998 |
| JP | 10334065 | 12/1998 |
| JP | 11-053154 | 2/1999 |

* cited by examiner

*Primary Examiner*—David Y. Eng
(74) *Attorney, Agent, or Firm*—Greer, Burns & Crain, Ltd.

(57) ABSTRACT

A message processing apparatus which handles messages exchanged over a network and explicitly notifies the recipient of the importance and other information regarding each received message. Incoming messages are received by a receiver employed in the apparatus. Those messages may contain some key information as part of their attribute data, which specifies a handler program relevant to them. A key information extraction unit extracts the key information from each received message. Consulting a table that defines the relationships between handler programs and various key information, a program loading unit then loads a specific handler program relevant to the extracted key information. The recipient may cause an event related to the received message. Depending on what kind of event it is, an execution unit chooses and executes an appropriate primitive process provided as part of the handler program. When, for example, the recipient attempts to delete an unopened message, the apparatus will warn him/her by displaying a warning message on a monitor screen.

8 Claims, 24 Drawing Sheets

| TYPE | PRIMARY SUB-KEYWORD | SECONDARY SUB-KEYWORD | ASSOCIATED PLUG-IN |
|---|---|---|---|
| MAIL | <URGENT: | BY ****> | TWPUrgentPlugin |
| MAIL | <MUST-READ | > | MustReadPlugin |
| MAIL | <TICKER | > | TickerPlugin |
| ... | ... | ... | ... |
| FORUM | <MUST-READ | > | MustReadPlugin |

FIG.6

```
Public TWPUrgent Plugin implements TWPPlugin{
      // INITIALIZATION
      public void init(TWPMessage Context context, String arg);
      // MESSAGE RECEPTION
      public void arrived();
      // APPLICATION RESTART
      public void restarted();
      // MESSAGE SELECTION
      public void selected();
      // MESSAGE DELETION
      public void deleted();
}
```

FIG.7

From:Manager<manager@bar>

To:Foo<foo@bar>

Date:Fri 11, Jul 1999 12:00:00 +900

Subject: <URGENT: BY 99/06/14>Correction of Document

The invention summary I sent you the other day
needs the following corrections...

MESSAGE PROCESSING APPARATUS

BACKGROUND OF THE INVENTION

1. Field of the Invention

The present invention relates to a message processing apparatus, and more particularly, to a message processing apparatus which receives and displays messages sent from sending stations.

2. Description of the Related Art

The proliferation of personal computers has been promoting message communications over electronic media, including electronic mail exchange and net news reading. As people receive more and more messages every day, there will be an urgent need to efficiently deal with a large number of incoming messages, sorting out important ones from others.

To meet the above need, some conventional message processing apparatus handling e-mail and other electronic messages provide a message flag function which allows the sender to set a certain flag when sending what he/she thinks is an important message. At the receiving end, messages appearing on a display screen are marked with a special symbol (e.g., exclamation mark "!") if their flags are set. Some other conventional apparatus offer e-mail filters which put the received messages into separate folders or make some of them invisible to the recipient, effectively screening them by sender names or some keywords contained in the messages. The mail recipients can set up such filters to meet their individual needs.

The above message screening functions, however, are limited in their capabilities. Particularly, they provide only simple visual distinctions between important messages and unimportant ones, which are so insufficient that the recipient sometimes fails to catch important notes or even discards them.

Another deficiency is non-uniformity in the behavior of receiving ends. In conventional message processing systems, the individual users have to set up their systems by themselves. Thus the receiving systems may react to the same message in different ways depending on their individual setups.

SUMMARY OF THE INVENTION

Taking the above into consideration, an object of the present invention is to provide a message processing apparatus which processes received messages according to their content, in such a way that many users share the same processing methods.

To accomplish the above object, according to the present invention, there is provided a message processing apparatus for receiving and displaying messages sent from a sending end. This message processing apparatus comprises a receiver, a key information extraction unit, a program loading unit, and an execution unit. The receiver receives a message sent from the sending end. The key information extraction unit extracts key information from the message received by the receiver. The key information is contained in a message as part of its attribute data, and used to identify a predetermined handler program relevant to the message. The program loading unit loads the predetermined handler program associated with the extracted key information. The execution unit executes the handler program loaded by the loading unit at prescribed times.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram which shows a typical keyword lookup table;

FIG. 7 is a diagram which shows a typical primitive process description;

FIG. 10 is a diagram showing an example of a received e-mail message;

DESCRIPTION OF THE PREFERRED EMBODIMENTS

Preferred embodiments of the present invention will be described below with reference to the accompanying drawings.

Figure 1:
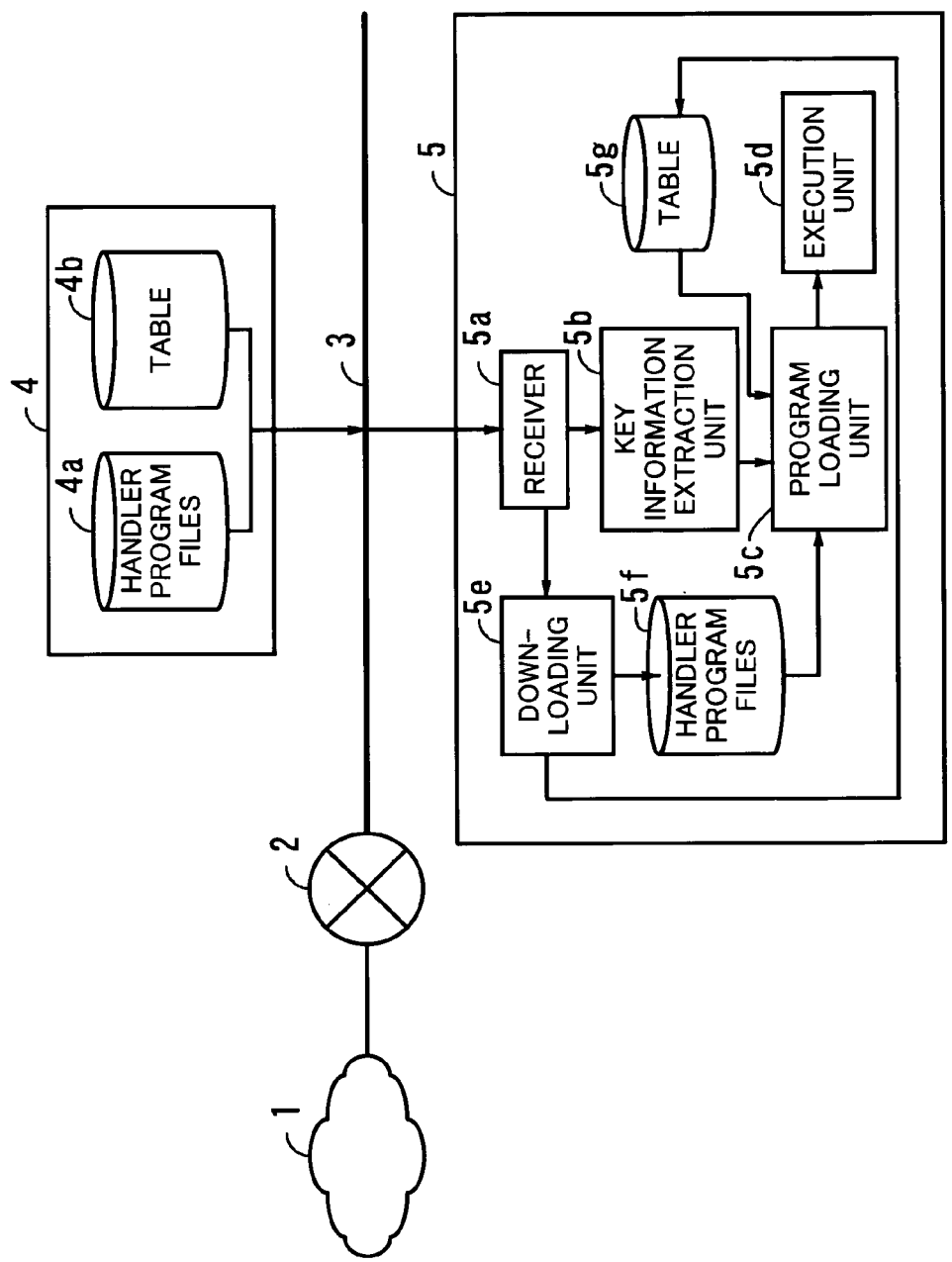
FIG. 1 is a conceptual view of the present invention.

FIG. 1 is a conceptual view of the present invention, illustrating a local area network (LAN) environment which is linked to another network 1 through a gateway 2. The network 1 is a wider networking environment such as the Internet, where data packets are transmitted back and forth. The gateway 2 enables a distributing station 4 and receiving station 5 on the local area network to gain access to other devices on the network 1. For this purpose, the gateway 2 provides various services, including message format transformation, address translation, and protocol conversion. Network cables 3 provide LAN interconnections between the distributing station 4, receiving stations 5, and other network nodes not shown in FIG. 1. While FIG. 1 illustrates only one receiving station 5, it has to be appreciated that there are a plurality of like stations in a real-world system.

The distributing station 4 stores handler program files 4a and a table 4b. The handler program files 4a provide a collection of processes which the receiving station 5 will execute when it receives a message containing particular key information, or keywords. The table 4b defines the relationships between such keywords and their associated handler programs. The system administrator or other authoritative persons maintain the contents of those handler program files 4a and table 4b. When they are updated, the distributing station 4 sends a request message to apply the update to corresponding local files in the receiving station 5.

The receiving station 5 comprises a receiver 5a, a key information extraction unit 5b, a program loading unit 5c, an execution unit 5d, a downloading unit 5e, handler program files 5f, and a table 5g. With those functional elements, the receiving station 5 receives and displays messages sent from other stations. More specifically, the receiver 5a receives messages sent from a sending end. From each message received by the receiver 5a, the key information extraction unit 5b extracts a keyword, or key information, to identify a particular handler program that is relevant to the message. Messages optionally contain such a keyword as part of their attribute data.

The program loading unit 5c installs a handler program corresponding to a given keyword. Here, the term "loading" refers to an operation of transferring a program from the computer's secondary storage to main memory, thereby making it ready to execute. The execution unit 5d executes the handler program prepared by the program loading unit 5c at appropriate times.

The downloading unit 5e downloads the handler program files 4a and the table 4b to update its local handler program files 5f and table 5g when it is requested by the distributing station 4. The handler program files 5f are a replica of the files 4a stored in the distributing station 4, providing a collection of processes associated with each keyword. The table 5g is a replica of the table 4b in the distributing station 4, which defines the relationships between message keywords and their associated handler programs.

The above system of FIG. 1 will operate as follows. Suppose, for example, that a certain station (not shown) on the network has created and transmitted to the receiving station 5 a message containing a keyword "<MUST-READ>" in its subject line, one of the message's attribute data fields. This message is received by the receiver 5a in the receiving station 5 and supplied to the key information extraction unit 5b. The key information extraction unit 5b takes out a keyword from the message and supplies it to the program loading unit 5c. In the present example, the keyword "<MUST-READ>" is extracted and supplied to the program loading unit 5c.

The program loading unit 5c first refers to the table 5g to determine which handler program is relevant to the extracted keyword "<MUST-READ>." The program loading unit 5c then loads the selected handler program to the system, converting it into executable form. The loaded handler program provides a collection of primitive processes. Now that the program is loaded, the execution unit 5d is ready to choose and execute an appropriate primitive process in response to an event that may occur to the received message. The handler program will be removed when its corresponding message is deleted, because it is loaded in association with each individual message.

With the handler program for the keyword "<MUST-READ>" loaded, the receiving station 5 first reacts to the event of "message reception" by displaying the following note on a monitor screen (not shown).

-- A must-read message has just arrived--

Although this note prompts the recipient to read the message, the user may or may not open it immediately. If he/she reads the message at once, no further primitive processes will be executed, and the system removes the handler program when the user deletes the message. The recipient, however, may leave the message unread. If this is the case, the system will invoke a primitive process for another event "restart," the next time the user launches his/her mailer application. The system then outputs another notification message as follows.

--There is one must-read message in your inbox--

While this notification prompts again the recipient to read the important message, he/she may even attempt to delete it by mistake. Or the mailer application may be programmed to erase the message when its storage time limit has expired. In such cases, the presence of keyword "<MUST-READ>" invokes a primitive process corresponding to the "deletion" event, causing the system to display the following warning message, for example.

--You are deleting a must-read message!--

As previously noted, the distributing station 4 notifies the receiving stations 5 when any modification is made to the handler program files 4a or table 4b. In that case, the downloading unit 5e downloads new information from the distributing station 4 to update its local handler program files 5f and table 5g.

Thus, to summarize the above processing, the receiving station 5 receives a message, loads a handler program corresponding to key information (keyword) extracted from the received message, and executes appropriate primitive processes depending on the subsequent events. This mechanism keeps providing the user with timely notification about the received e-mail messages throughout their lifetime, from reception to deletion.

While FIG. 1 shows only one receiving station, two or more such stations can be connected to the network. Those receiving stations share the same set of handler program files and tables, since they are delivered from a single source, i.e., the distributing station 4. This naturally results in a unified behavior of the receiving stations when they receive a message containing a particular keyword. Further, the contents of the handler program files 4a and table 4b can be centrally managed by the administrator of the distributing station 4. This liberates the users of the receiving stations 5 from burdensome tasks of keeping their local files up to date.

Figure 2:
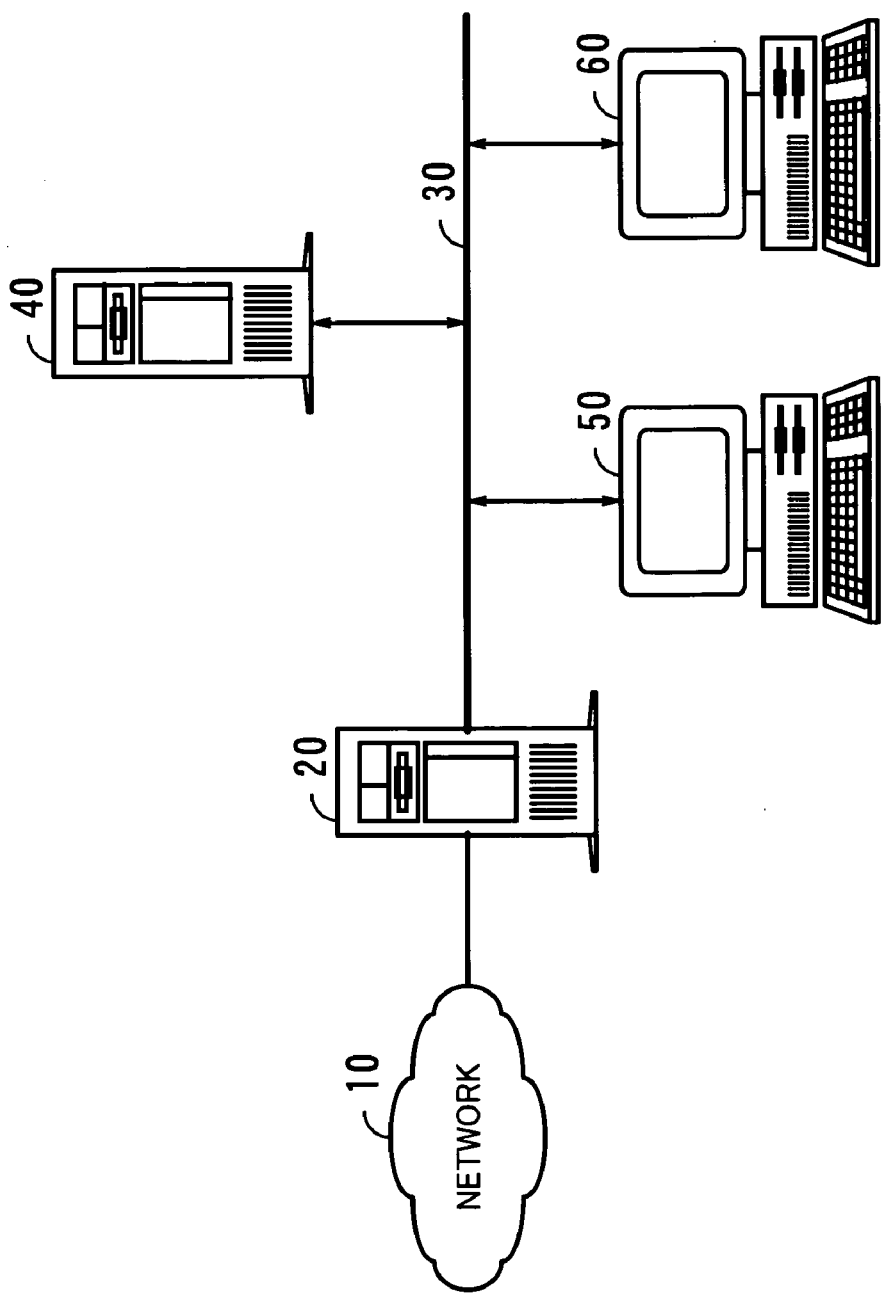
FIG. 2 is a diagram which shows a typical embodiment of the present invention.
Figure 3:
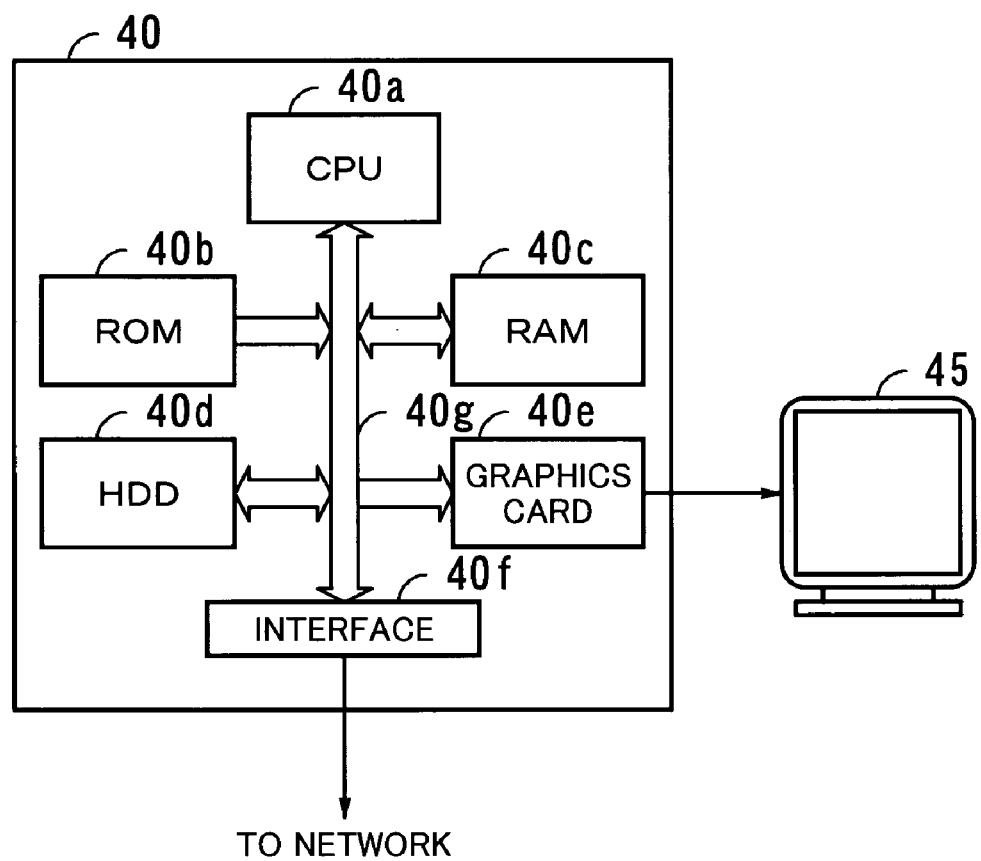
FIG. 3 is a diagram which shows the details of a distributing station shown in FIG. 2.

Referring now to FIGS. 2, 3, and so on, a preferred embodiment of the present invention will be described in detail below. FIG. 2 shows a LAN environment which is linked to another network 10 via a gateway 20. The LAN interconnects a distributing station 40 and receiving stations 50 and 60. The network 10 is a wider networking environment such as the Internet, where data packets are transmitted back and forth. The gateway 20 is a workstation-based network element, which provides various services including message format transformation, address translation, and protocol conversion to enable data exchange between the LAN and the other network 10.

The distributing station 40 has a keyword lookup table that defines the relationships between message keywords and their associated handler programs. In the table, each handler program is referred to by its class name. The distributing station 40 also has primitive process descriptions that define a plurality of classes. Each handler program provides a collection of processes which the receiving stations 50 and 60 will execute when it receives a message containing particular key information, or keywords. The distributing station 40 requests the receiving stations 50 and 60 to update their local files, if the keyword lookup tables and/or primitive process descriptions in the distributing station 40 have been updated, or when the system administrator has instructed so.

FIG. 3 shows a detailed hardware configuration of the distributing station 40. As seen from FIG. 3, the distributing station 40 comprises a central processing unit (CPU) 40a, a read-only memory (ROM) 40b, a random access memory (RAM) 40c, a hard disk drive (HDD) 40d, and a graphics card 40e, an interface 40f, and a bus 40g. Additionally, an external monitor unit 45 is coupled to the distributing station 40.

The CPU 40a performs various operations according to the programs loaded on the RAM 40c, etc., besides controlling other parts of the distributing station 40. The ROM 40b stores basic system programs and data that the CPU 40a executes and manipulates. The RAM 40c serves as temporary storage for programs and data that the CPU 40a executes and manipulates at runtime. The HDD 40d stores the aforementioned keyword lookup table and primitive process descriptions, in addition to various application programs which the CPU 40a executes.

The graphics card 40e produces image data in accordance with drawing commands from the CPU 40a and provides the monitor unit 45 with the resultant images in the form of video signals. The interface 40f is where a LAN cable 30 is terminated. It supports certain protocols to allow the distributing station 40 to communicate with the receiving stations 50 and 60. The monitor unit 45 is a cathode ray tube (CRT) monitor, for example, which displays text and graphic images according to the video signals supplied from the graphics card 40e.

Referring back to FIG. 2, the receiving stations 50 and 60 receive and display messages sent from other network nodes. They also provide various services according to the primitive processes defined in a specific primitive process description supplied from the distributing station 40.

Figure 4:
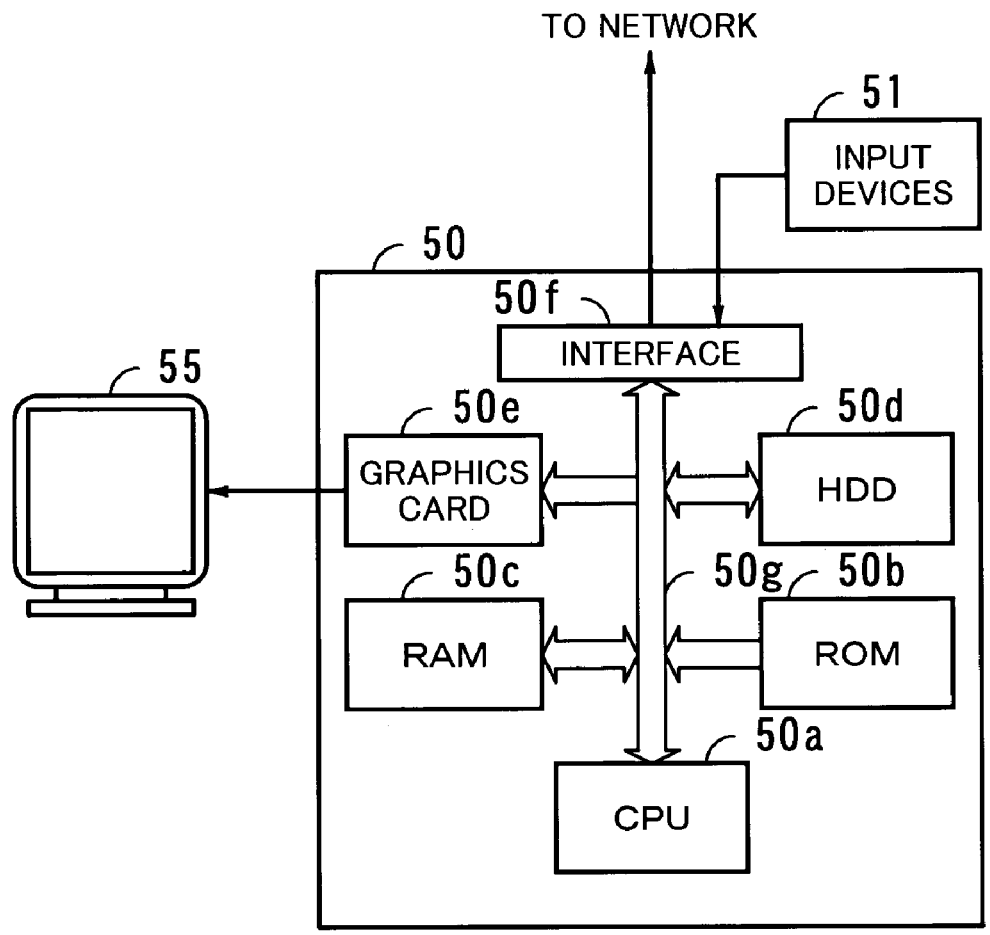
FIG. 4 is a diagram which shows the details of a receiving station shown in FIG. 2.

FIG. 4 shows the details of the receiving station 50. Since the receiving station 50 and the receiving station 60 are similar in structure, the following explanation will focus on the receiving station 50. As seen from FIG. 4, the receiving station 50 comprises a CPU 50a, a ROM 50b, a RAM 50c, an HDD 50d, a graphics card 50e, an interface 50f, and a bus 50g. Additionally, some external input devices 51 and a monitor unit 55 are connected to the receiving station 50. Such elements of the receiving station 50 are similar to those that constitute the distributing station 40 explained in FIG. 3. Thus the details of their operation will not be described here again.

The input devices 51 may include a keyboard and a mouse, for example, with which the user enters operating commands to the receiving station 50. The monitor unit 55 is a CRT monitor or other display device, as is the aforementioned monitor unit 45. It displays text and graphic images according to the video signals supplied from the receiving station 50.

The operation of the above system will now be explained below, starting with a process to download a keyword lookup table and primitive process description from the distributing station 40 to the receiving station 50.

Figure 5:
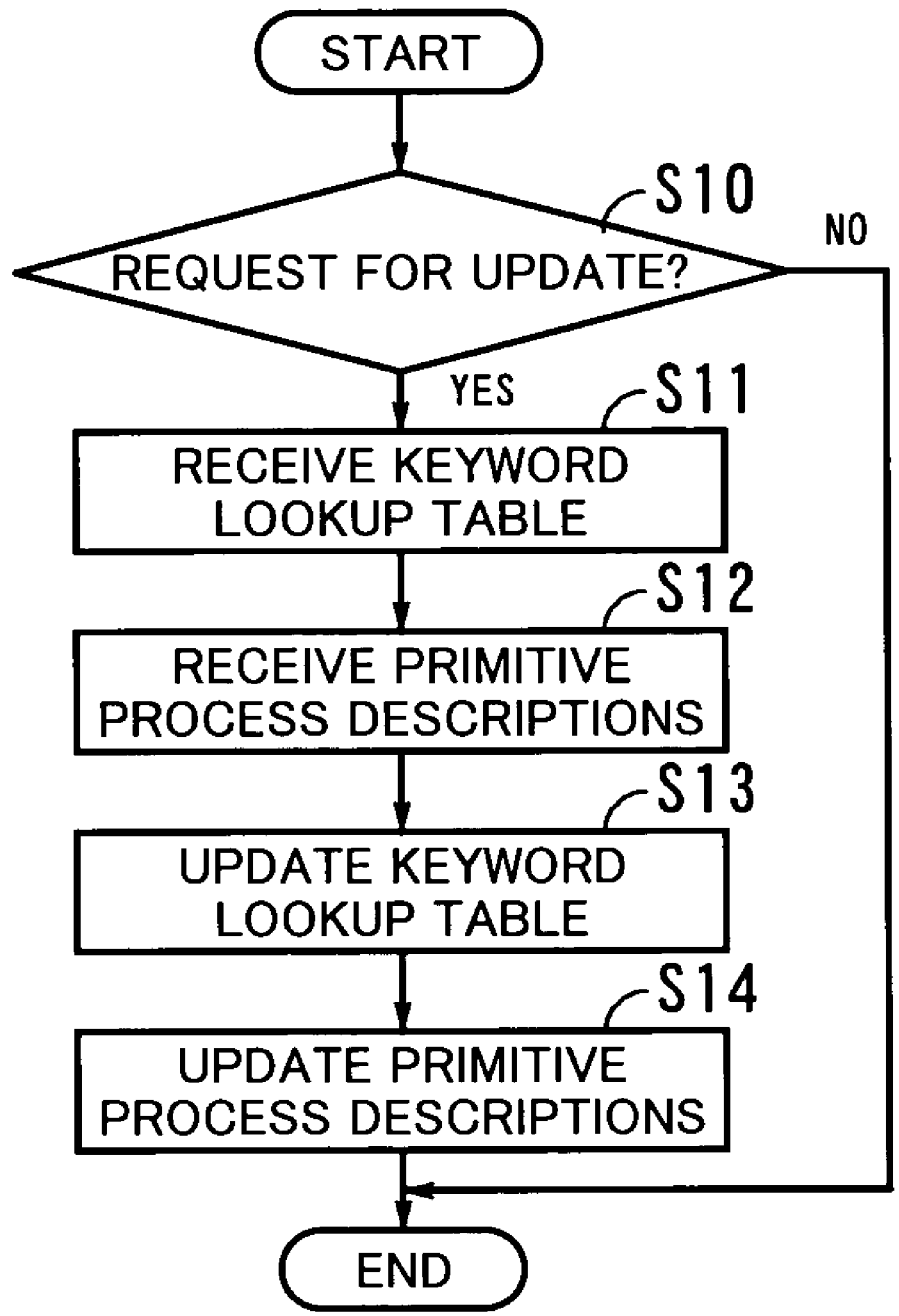
FIG. 5 is a flowchart which explains a typical process executed by a receiving station when downloading a keyword lookup table and primitive process description from the distributing station.

FIG. 5 is a flowchart which describes a typical process to be executed by the receiving station 50 when downloading a keyword lookup table and primitive process description from the distributing station 40. The receiving station 50 calls this process in response to a request from the distributing station 40. Such requests occur when some update is made to the keyword lookup table or primitive process descriptions in the distributing station 40, or when the administrator sends a certain instruction to the distributing station 40. When invoked, the process executes the following steps.

(S10) The CPU 50a determines whether there is any data update request from the distributing station 40. If there is, the process advances to step S11. If not, the process is terminated.

(S11) The CPU 50a receives a keyword lookup table from the distributing station 40.

(S12) The CPU 50a receives primitive process descriptions from the distributing station 40.

(S13) The CPU 50a updates the keyword lookup table stored in the HDD 50d.

(S14) The CPU 50a updates the primitive process descriptions stored in the HDD 50d.

FIG. 6 shows an example of the keyword lookup table. This keyword lookup table provides four kinds of data items: type, primary sub-keyword, secondary sub-keyword, and associated plug-in. The first entry of the table, for instance, shows that the messages of type "MAIL" containing a primary sub-keyword "<URGENT:" and a secondary sub-keyword "BY **>" (** is a date code) are to be handled by its associated plug-in named "TWPUrgentPlugin." As such, incoming messages may optionally contain a keyword in their subject line (or title) as one of the message attributes. Each keyword is generally composed of two substrings: primary sub-keyword and secondary sub-keyword. For example, "<URGENT: BY 99/06/14>" is a typical composite keyword inserted in the title of a message.

Every keyword is associated with a specific plug-in, which is a description (e.g., Java class) that defines a collection of primitive processes. FIG. 7 shows a typical plug-in, named "TWPUrgentPlugin," which appears in the keyword lookup table of FIG. 6. This plug-in consists of the following five primitive processes: initialization, message reception, application restart, message selection, and message deletion.

Figure 8:
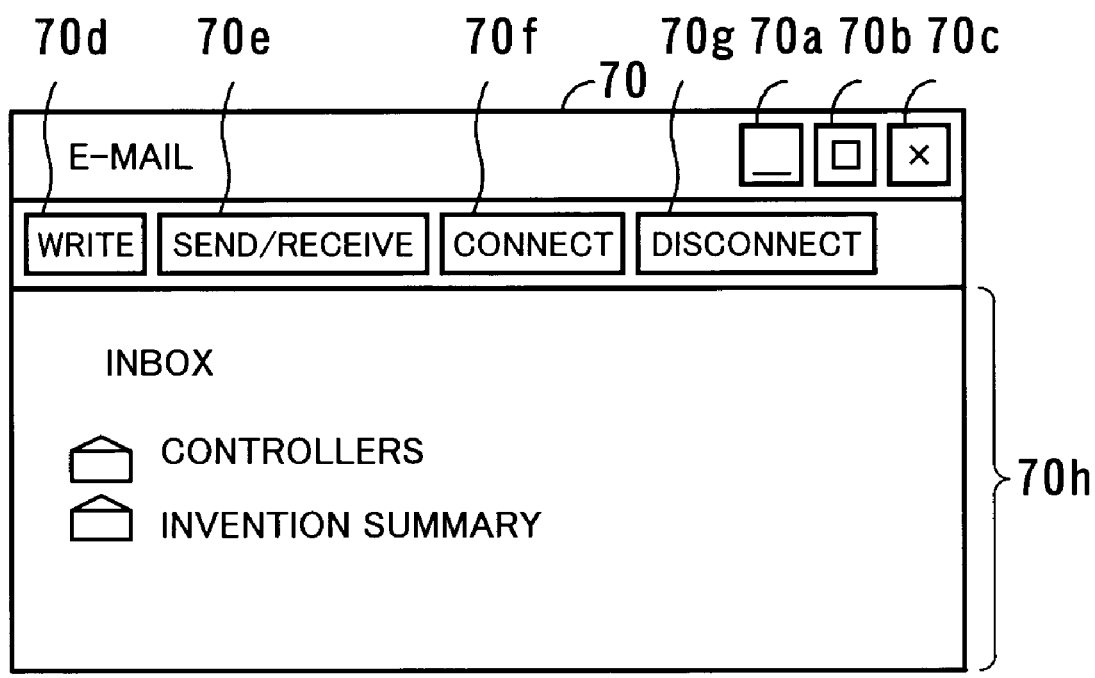
FIG. 8 is a diagram which shows a typical screen of a mailer application program designed to receive e-mail messages.

When a message is received, the receiving station 50 will operate as follows. Suppose here that the user of the receiving station 50 has operated the input devices 51 to run a certain application program to send and/or receive e-mail messages. FIG. 8 shows a window 70 to be displayed on the monitor unit 55 when such a mailer application program is started. On this example screen, the window 70 titled "E-MAIL" comes with a Minimize button 70a, a Maximize button 70b, and a Close button 70c aligned in the upper right corner for controlling the window 70. The window 70 further provides the following buttons for manipulating messages and controlling server connection. A Write button 70d is used when writing a new message. A Send/Receive button 70e is used when sending and/or receiving messages. The user presses a Connect button 70f or Disconnect button 70g when connecting or disconnecting his/her station to/from its local mail server. The pane 70h shows the current contents of the user's inbox. In this example of FIG. 8, the inbox stores two e-mail messages that have been opened by the user.

Figure 9:
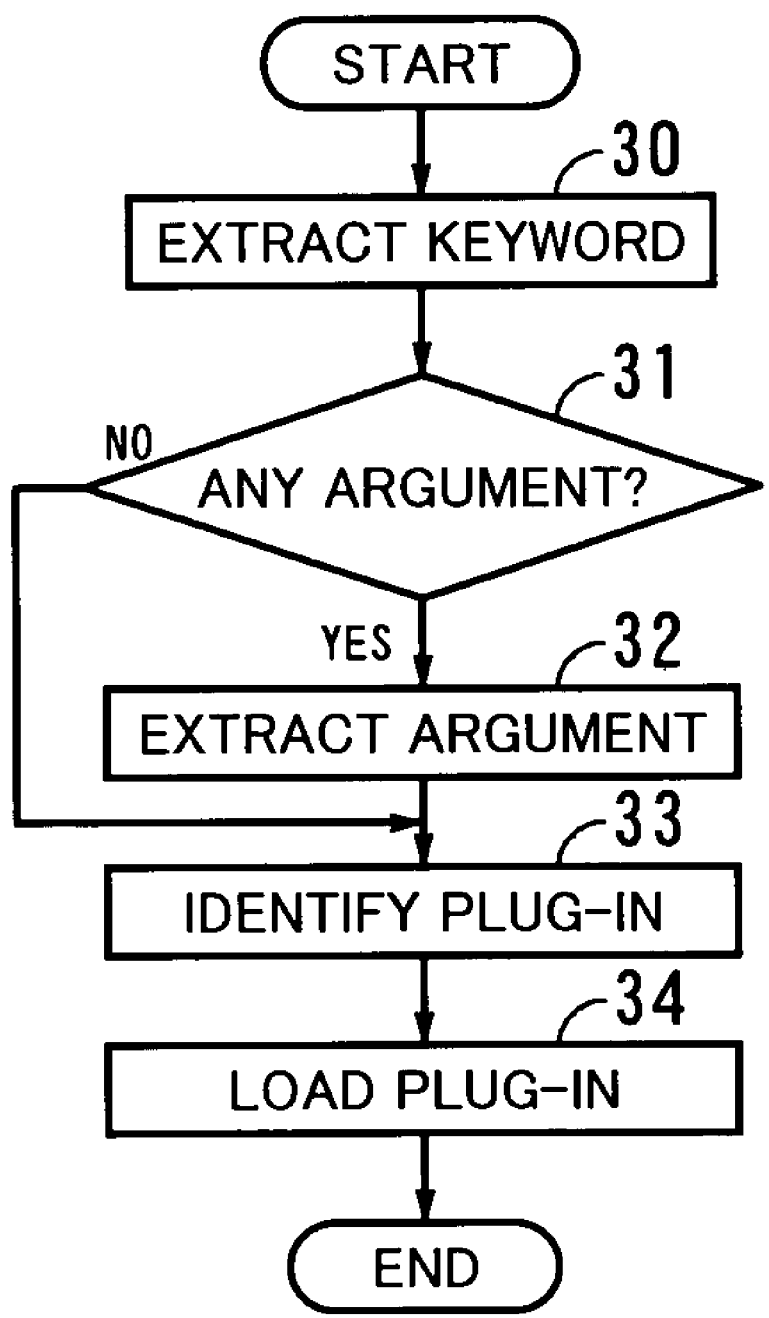
FIG. 9 is a flowchart showing a typical process to be executed to identify a specific plug-in that is relevant to a received e-mail message.

Suppose here that the user has pressed the Send/Receive button 70e. In response to that, the receiving station 50 connects itself to the mail server and checks whether the server has any e-mail messages addressed to the user. If there are messages, the receiving station 50 downloads them and executes a process shown in the flowchart of FIG. 9. More specifically, the following steps are executed.

(S30) The CPU 50a extracts a keyword, if any, from the subject line of the received e-mail message. Consider, for example, that the inbox holds an e-mail message shown in FIG. 10. The subject line of this message contains a keyword that reads "<URGENT: BY 99/06/14>," and the CPU 50a now extracts a primary sub-keyword "<URGENT:" and a secondary sub-keyword "BY 99/06/14>."

(S31) The CPU 50a determines whether the keyword has any arguments. If it has, the process advances to step S32. If not, the process proceeds to step S33.

(S32) The CPU 50a extracts arguments from the keyword string. In the example of FIG. 10, an argument "99/06/14" is extracted.

(S33) Consulting the keyword lookup table, the CPU 50a identifies which plug-in is associated with the keyword. In the present case, the composite keyword is "<URGENT: BY ****>," the CPU 50a obtains its relevant plug-in "TWPUrgentPlugin" by referring to the keyword lookup table of FIG. 6.

(S34) The CPU 50a makes access to the HDD 50d to read out and load the plug-in that has been identified at step S33. In the present example, the CPU 50a reads a Java class "TWPUrgentPlugin" out of the HDD 50d and creates an object corresponding to the plug-in. This object includes a collection of primitive processes and is linked to the e-mail message of interest. Accordingly, a relevant primitive process will be selected and invoked when a prescribed event occurs to that message. When the e-mail message of interest is deleted, its associated object will also be deleted at the same time. The next paragraph will focus on the primitive processes.

Figure 11:
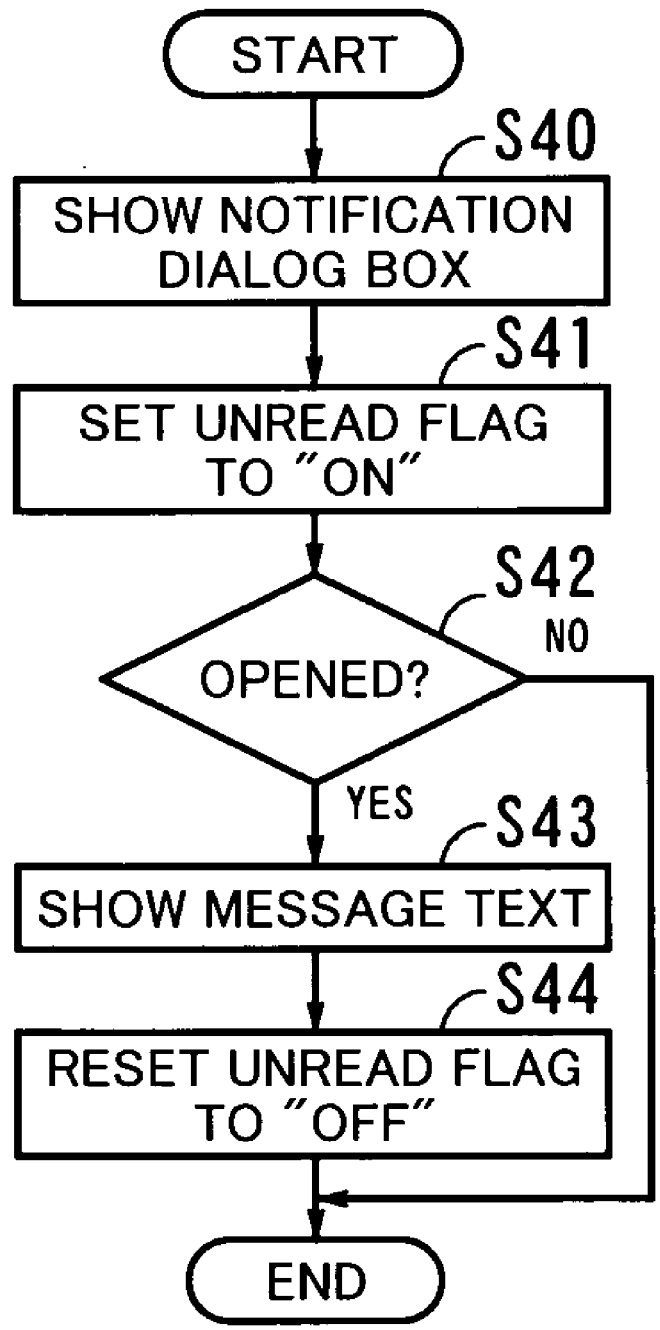
FIG. 11 is a flowchart showing a typical process to be executed when an e-mail message with a keyword "<URGENT: BY ****>" is received.

FIG. 11 is a flowchart showing the message reception process (FIG. 7), one of the primitive processes of the plug-in "TWPUrgentPlugin." This process comprises the following steps.

Figure 12:
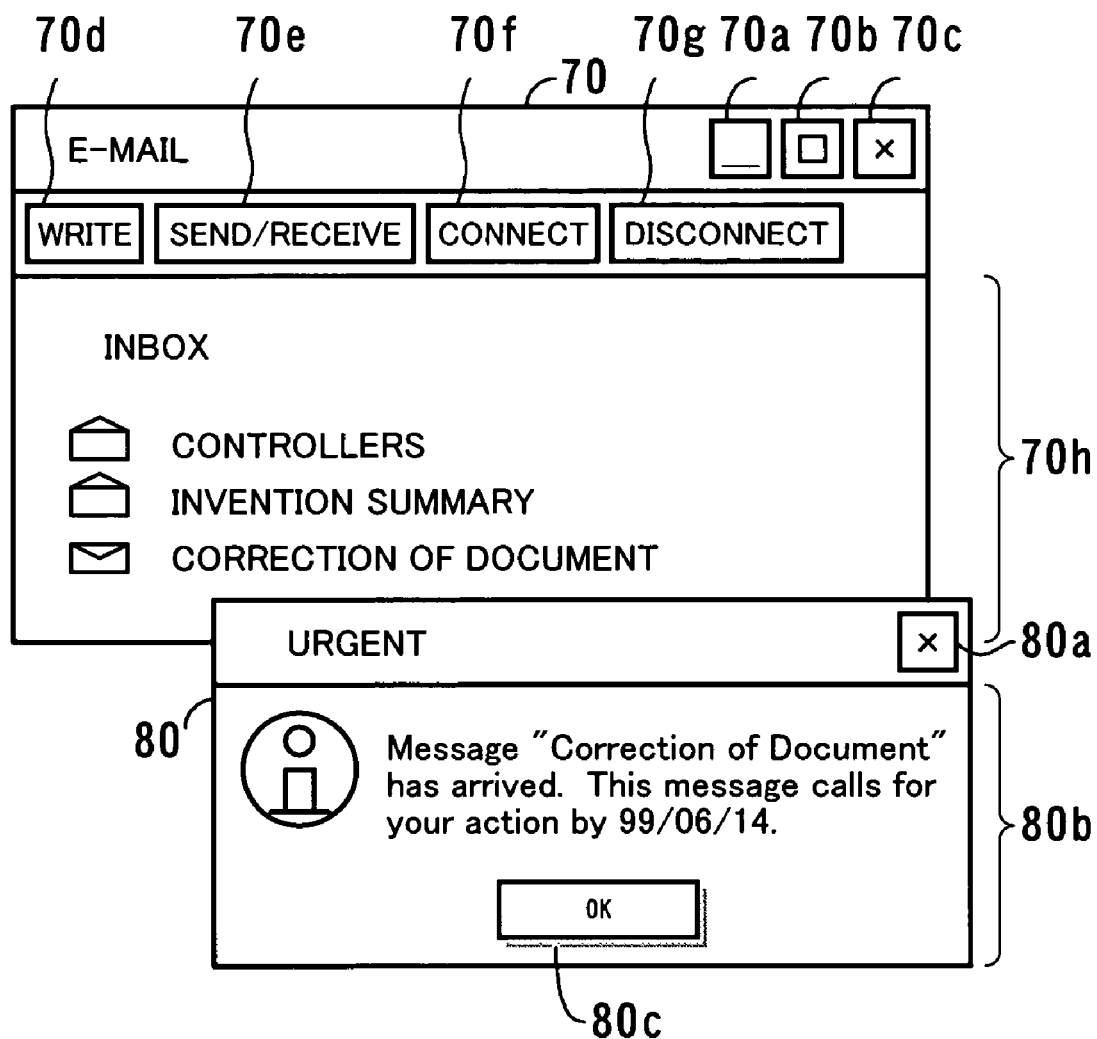
FIG. 12 is a diagram which shows a typical screen displayed on the monitor unit as a result of the process of FIG. 11.

(S40) The CPU 50a causes the monitor unit 55 to display a notification dialog box. FIG. 12 shows a typical screen which appears when a e-mail message of FIG. 10 is received. Compared with FIG. 8, the pane 70h of the application program window 70 now shows the title of a newly arrived message, "Correction of Document." In addition, a notification dialog box 80 titled "URGENT" pops up over the application program window 70. The dialog box 80 has a Close button 80a in the upper right corner for closing the dialog box itself. The dialog box 80 shows the following notification on its pane 80b.

--Message "Correction of Document" has arrived. This message calls for your action by 99/06/14.--

Further, at the bottom of the pane 80b, an OK button 80c is located to allow the recipient to acknowledge the notification.

(S41) The CPU 50a sets the Unread flag to the ON state to indicate that the recipient has not yet opened the e-mail message.

(S42) The CPU 50a determines whether the recipient has already opened the e-mail message in question. If he/she has, the process advances to step S43. If not, the process is terminated.

(S43) The CPU 50a shows the message text. In the present case, the monitor unit 55 presents a message window shown in FIG. 10.

(S44) The CPU 50a resets the Unread flag to the OFF state.

Figure 13:
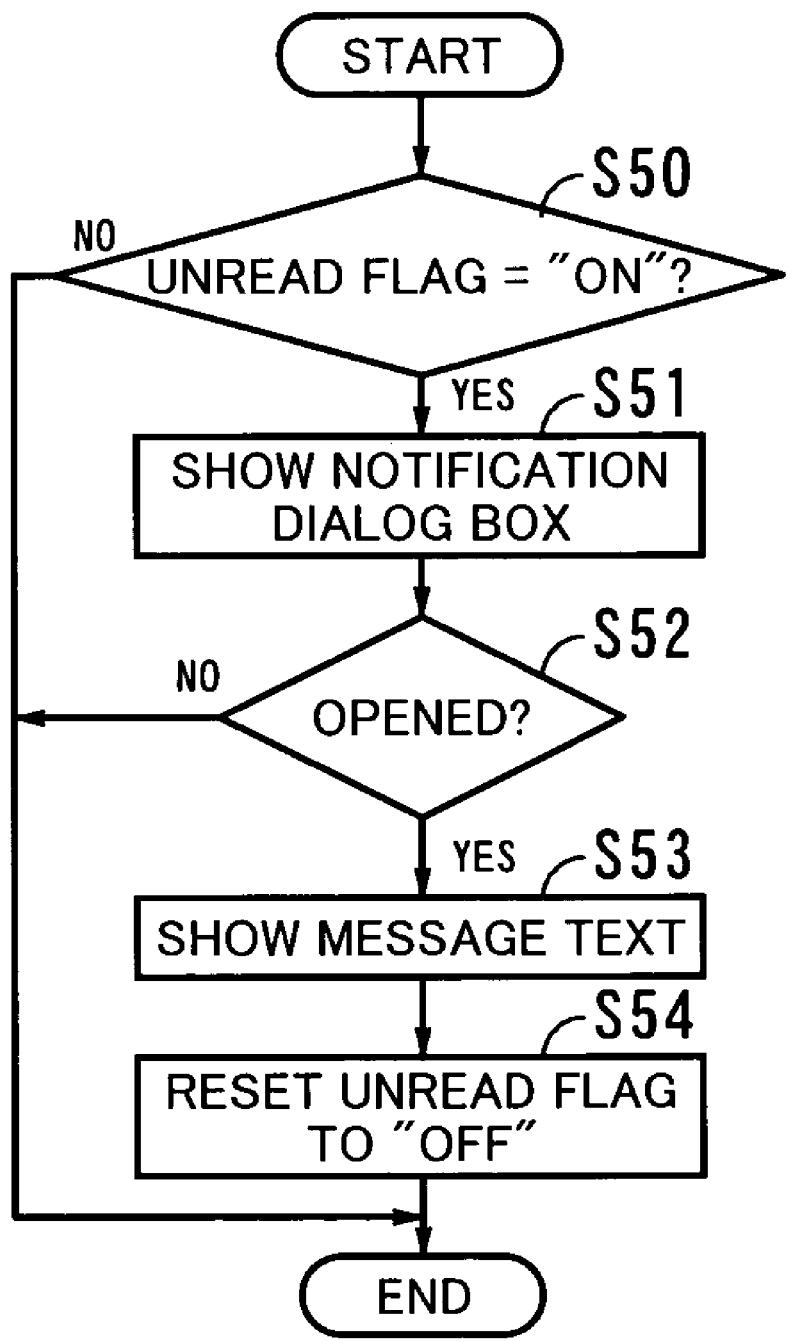
FIG. 13 is a flowchart showing a typical process to be executed when the mailer application program is launched again after being closed without opening the e-mail message with a keyword "<URGENT: BY ****>;"

Through the above process steps, the receiving station 50 finds a keyword "URGENT" in an incoming e-mail message and produces a notification dialog box to inform the recipient that the received message requires timely action. This notification prompts the recipient to read the message and respond to it accordingly. The recipient, however, may not open the messages immediately, in spite of the notification shown in FIG. 12. Referring now to FIG. 13, the next section will describe how the proposed system will operate in such a situation.

Suppose that the recipient closes the application program without opening the newly arrived e-mail message shown in FIG. 12. Here, the recipient may even turn off the power of the receiving station 50. The next time he/she launches the application program, the receiving station 50 executes the following process steps.

(S50) The CPU 50a determines whether the Unread flag of the e-mail message in question is ON. If it is, the process advances to step S51. If not, the process is terminated. In the present example, the process advances to step S51 because the Unread flag was set to ON at step S41 in the process of FIG. 11 and the recipient closed the window of FIG. 12 without resetting the flag by opening the message.

Figure 14:
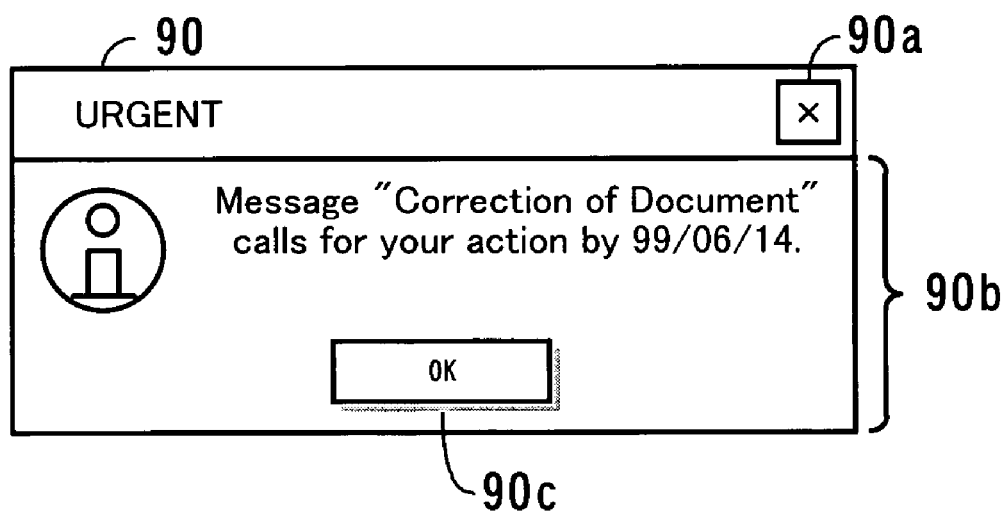
FIG. 14 is a diagram showing a typical screen which appears on the monitor unit as a result of the process of FIG. 13.

(S51) The CPU 50a displays a notification dialog box. FIG. 14 shows a typical layout of the notification dialog box. This dialog box 90 is titled "URGENT" and has a Close button 90a in the upper right corner for closing the dialog box 90. The pane 90b shows a note telling that the recipient is requested to take action by Jun. 14, 1999. At the bottom of the pane 90b, an OK button 90c is located to allow the recipient to acknowledge the notification.

(S52) The CPU 50a determines whether the recipient has opened the e-mail message in question. If so, the process advances to step S53. If not, the process is terminated.

(S53) The CPU 50*a* causes the monitor unit 55 to display the message text.

(S54) The CPU 50*a* resets the Unread flag of the message to the OFF state.

Through the above process steps, the restarted application program displays another notification dialog box to prompt the recipient to open the received message, even if he/she did not do so when the message arrived at his/her inbox. This notification reminds the recipient of the unopened e-mail message that needs prompt action.

Figure 15:
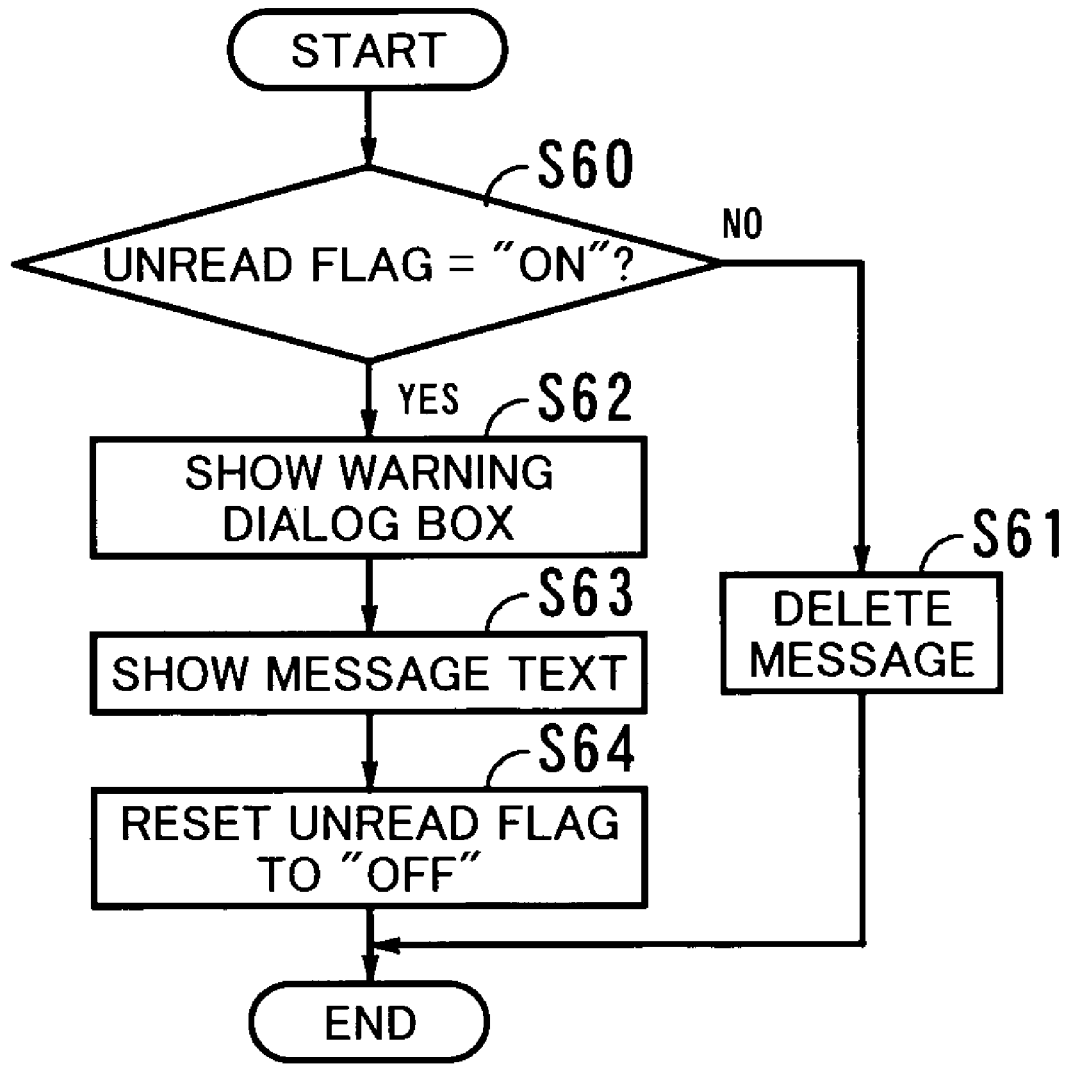
FIG. 15 is a flowchart showing a typical process to be executed when the user attempts to delete an e-mail message containing a keyword "<URGENT: BY ****>" without opening it.

The receiving station 50 further generates a warning message, when the user attempts to delete an urgent e-mail message without opening it in spite of the notification shown in FIG. 12. The receiving station 50 will also generate a like warning message when the mailer application program attempts to purge an e-mail message because of the expiration of its storage time limit that the inbox permits. Referring now to a flowchart of FIG. 15, the following will describe the process executed in such situations. This process comprises the following steps.

(S60) The CPU 50*a* determines whether the Unread flag of the e-mail message in question is in the ON state. If it is ON, the process advances to step S62. If not, the process proceeds to step S61. For instance, the process advances to step S62 when the recipient attempts to delete an unopened e-mail message appearing on the screen of FIG. 12. To the contrary, the process goes to step S61 if the recipient has already opened the message.

(S61) The CPU 50*a* executes a routine to delete the specified e-mail message.

Figure 16:
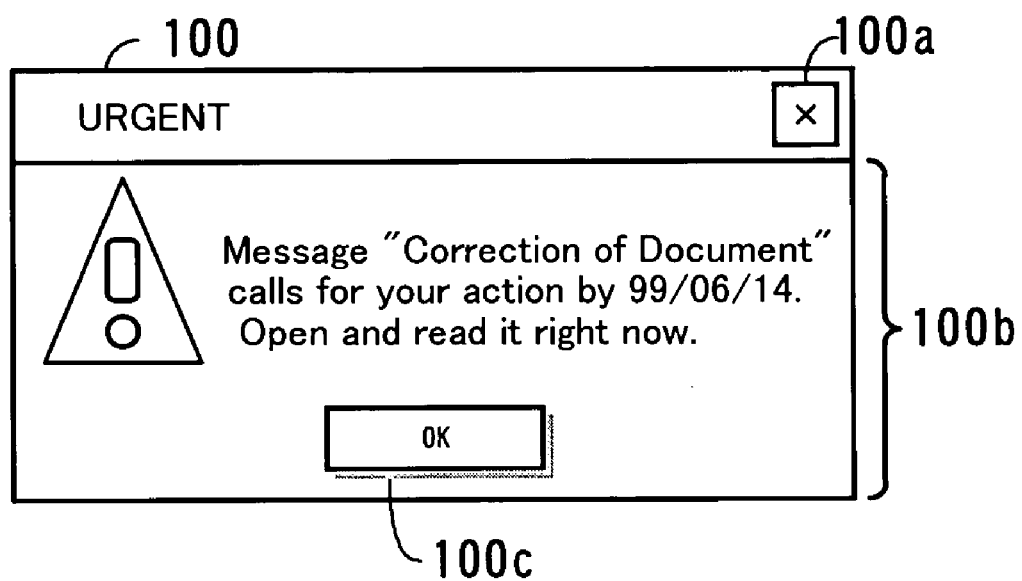
FIG. 16 is a diagram showing a typical screen that appears on the monitor unit as a result of the process of FIG. 15.

(S62) The CPU 50*a* displays a warning dialog box. FIG. 16 shows a typical warning dialog box 100, which is titled "URGENT" and has a Close button 100*a* in the upper right corner for closing the dialog box 100. The pane 100*b* now shows the following warning message.

--Message "Correction of Document" calls for your action by 99/06/14. Open and read it right now.--

At the bottom of the pane 100*b*, an OK button 100*c* is located to allow the recipient to acknowledge the above warning message.

(S63) The CPU 50*a* causes the monitor unit 55 to show the message text of interest.

(S64) The CPU 50*a* resets the Unread flag of the message to the OFF state.

Through the above process steps, the attempt to delete an unopened e-mail message causes a warning dialog box, as well as showing the message text. This prevents the recipient from deleting important e-mail messages accidentally.

The next section will focus on the primitive processes of another plug-in "MustReadPlugin" shown in FIG. 6. This plug-in handles e-mail messages with a must-see file attachment. In short, the sender inserts a composite keyword "<MUST-READ>" to the subject line of a message to make sure that the recipient opens the message and its attachment. When such a message is received, the receiving station loads and executes the "MustReadPlugin."

Figure 17:
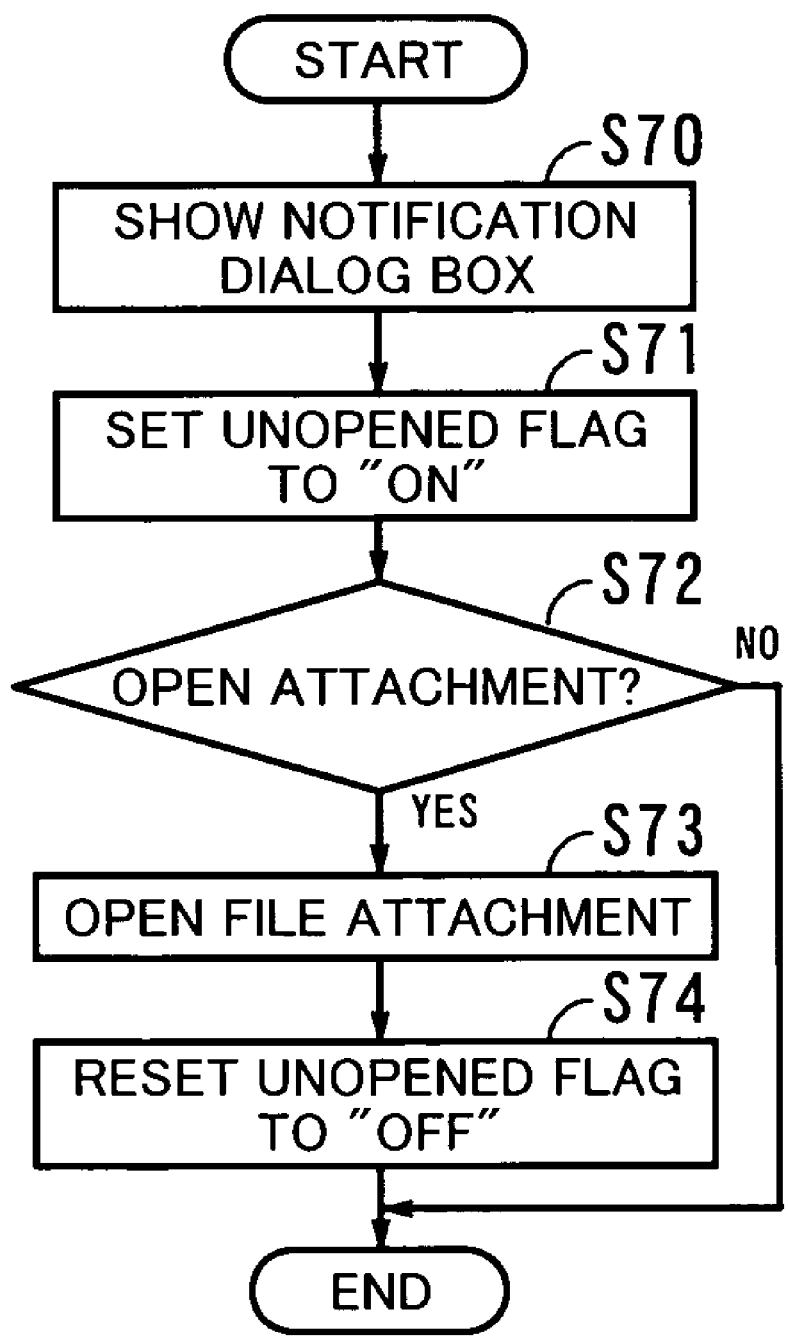
FIG. 17 is a flowchart showing a typical process to be executed when an e-mail message containing a keyword "<MUST-READ>" is received.

Referring first to a flowchart of FIG. 17, the following will describe a process to be executed when an e-mail message with a must-see attachment is received. The process comprises several steps as follows.

Figure 18:
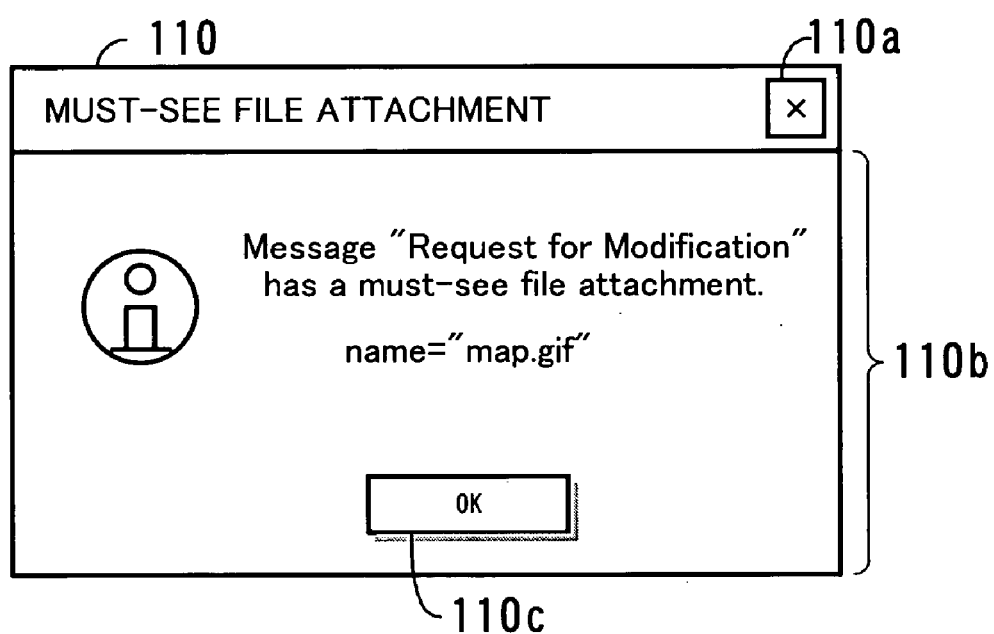
FIG. 18 is a diagram showing a typical screen that appears on the monitor unit as a result of the process of FIG. 17.

(S70) The CPU 50*a* causes the monitor unit 55 to display a notification dialog box. FIG. 18 shows a typical layout of the notification dialog box. This dialog box 110 is titled "MUST-SEE FILE ATTACHMENT" and has a Close button 110*a* in the upper right corner for closing the dialog box 110. The pane 110*b* shows a note that reads as follows.

--Message "Modification Required" has a must-see file attachment--

This note is followed by the name of the file attachment, "map.gif." Also, at the bottom of the pane 110*b*, an OK button 110*c* is placed to allow the recipient to acknowledge the above note.

(S71) The CPU 50*a* sets the Unopened flag to the ON state, thereby indicating that the recipient has not opened the file attachment.

(S72) The CPU 50*a* determines whether the recipient has opened the file attachment in question. If so, the process advances to step S73. If not, the process is terminated.

(S73) The CPU 50*a* causes the monitor unit 55 to open and show the file attachment.

(S74) The CPU 50*a* resets the Unopened flag to the OFF state.

Through the above process steps, the receiving station 50 produces a dialog box to notify the recipient of the arrival of an important file attachment, when it receives an e-mail message with a keyword "<MUST-READ>" in its subject line and is accompanied by a file attachment. This feature prevents the recipient from leaving the attachment unopened, while only reading the message text.

Figure 19:
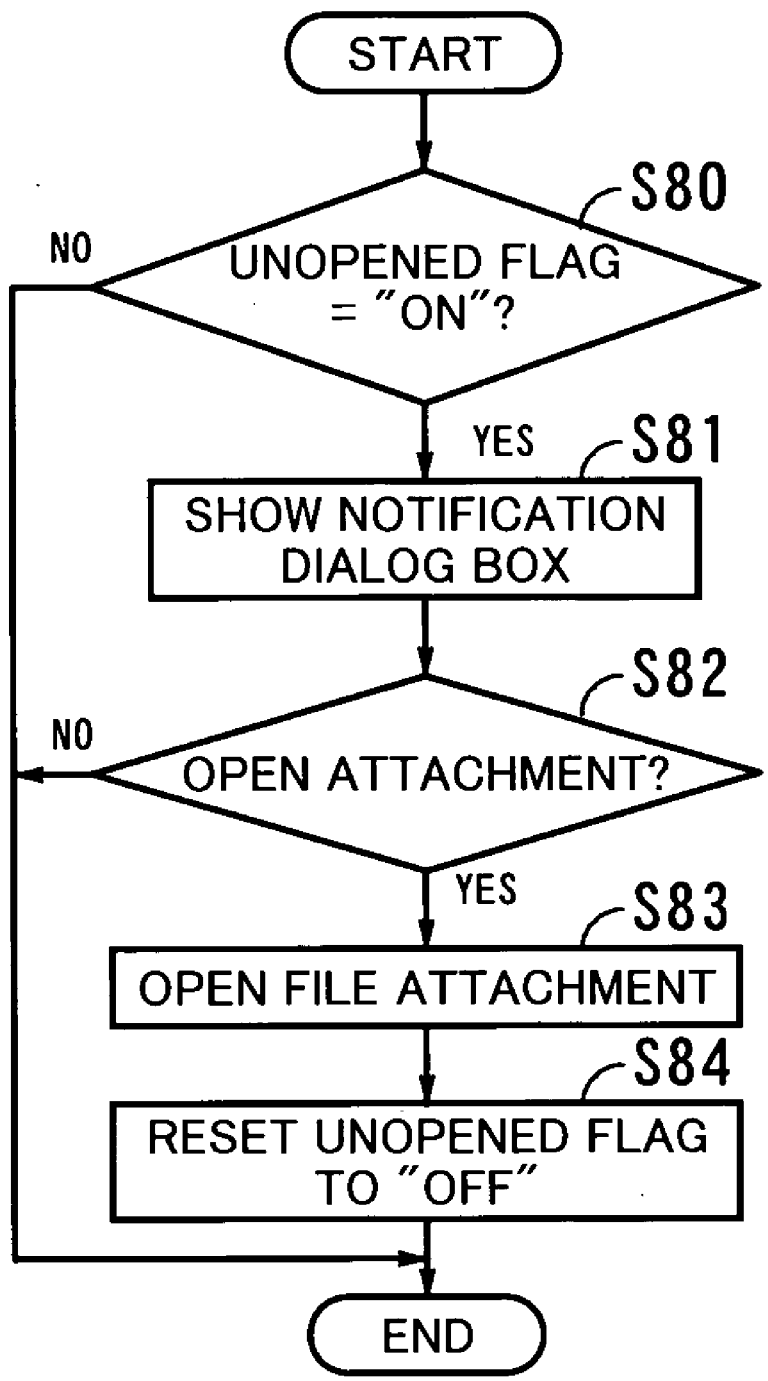
FIG. 19 is a flowchart showing a typical process to be executed when the mailer application program is launched again after being closed without opening a file attachment that is delivered in an e-mail message with a keyword "<MUST-READ>;"

Suppose next that the recipient closes the application program without opening the received file attachment. He/she may even turn off the power of the receiving station 50. FIG. 19 is a flowchart showing a process to be executed when the application program is launched again in such a situation. This process comprises the following steps.

(S80) The CPU 50*a* determines whether the Unopened flag of e-mail message in question is ON. If the flag is ON, the process advances to step S81. If not, the process is terminated.

Figure 20:
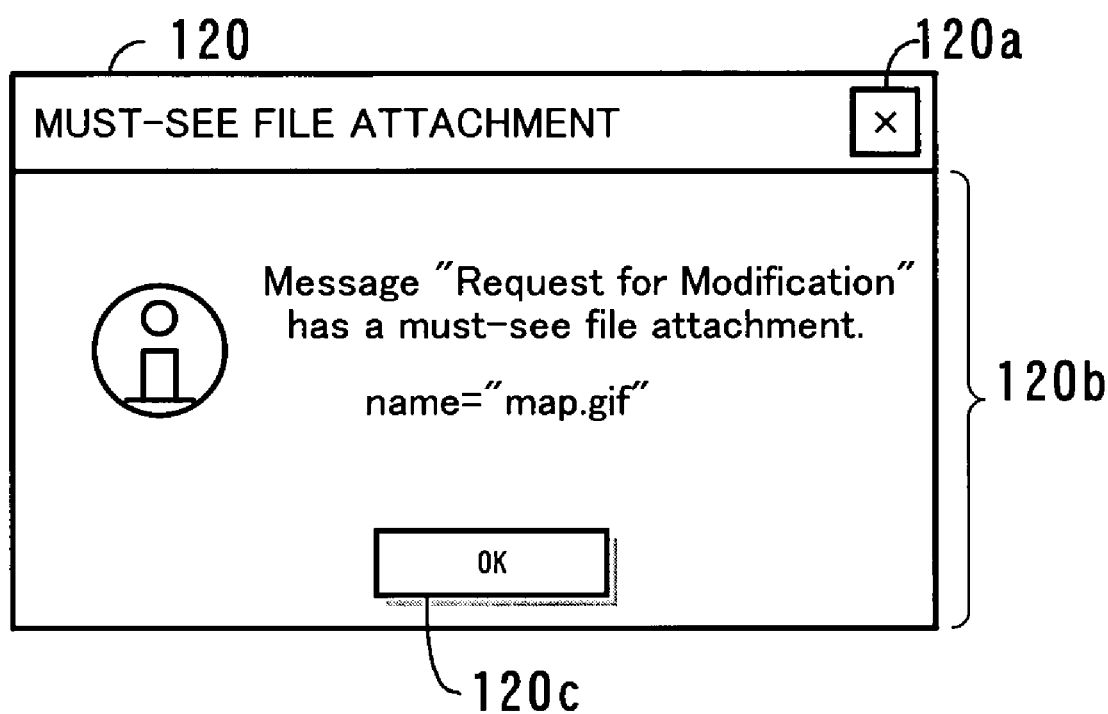
FIG. 20 is a diagram showing a typical screen that appears on the monitor unit as a result of the process of FIG. 19.

(S81) The CPU 50*a* displays a notification dialog box on the monitor unit 55. FIG. 20 shows a typical notification dialog box 120, which is titled "MUST-SEE FILE ATTACHMENT" and has a Close button 120*a* in the upper right corner for closing the dialog box 120. The pane 120*b* shows a note that reads as follows.

--Message "Request for Modification" has a must-see file attachment--

Further, this note is followed by the name of the file attachment, "map.gif." Also, at the bottom of the pane 120*b*, an OK button 120*c* is placed to allow the recipient to acknowledge the above note.

(S82) The CPU 50*a* determines whether the recipient commands the receiving station 50 to open and show the file attachment of to the e-mail message in question. If so, the process advances to step S83. If not, the process is terminated.

(S83) The CPU 50*a* opens and shows the file attachment on the monitor unit 55.

(S84) The CPU 50*a* resets the Unopened flag of the message to OFF.

Through the above process steps, the receiving station 50 displays a notification dialog box when the application program is launched again, even if the recipient did not do so when the message arrived at his/her inbox. The notification reminds the recipient of the important file attachment that has not been opened.

Figure 21:
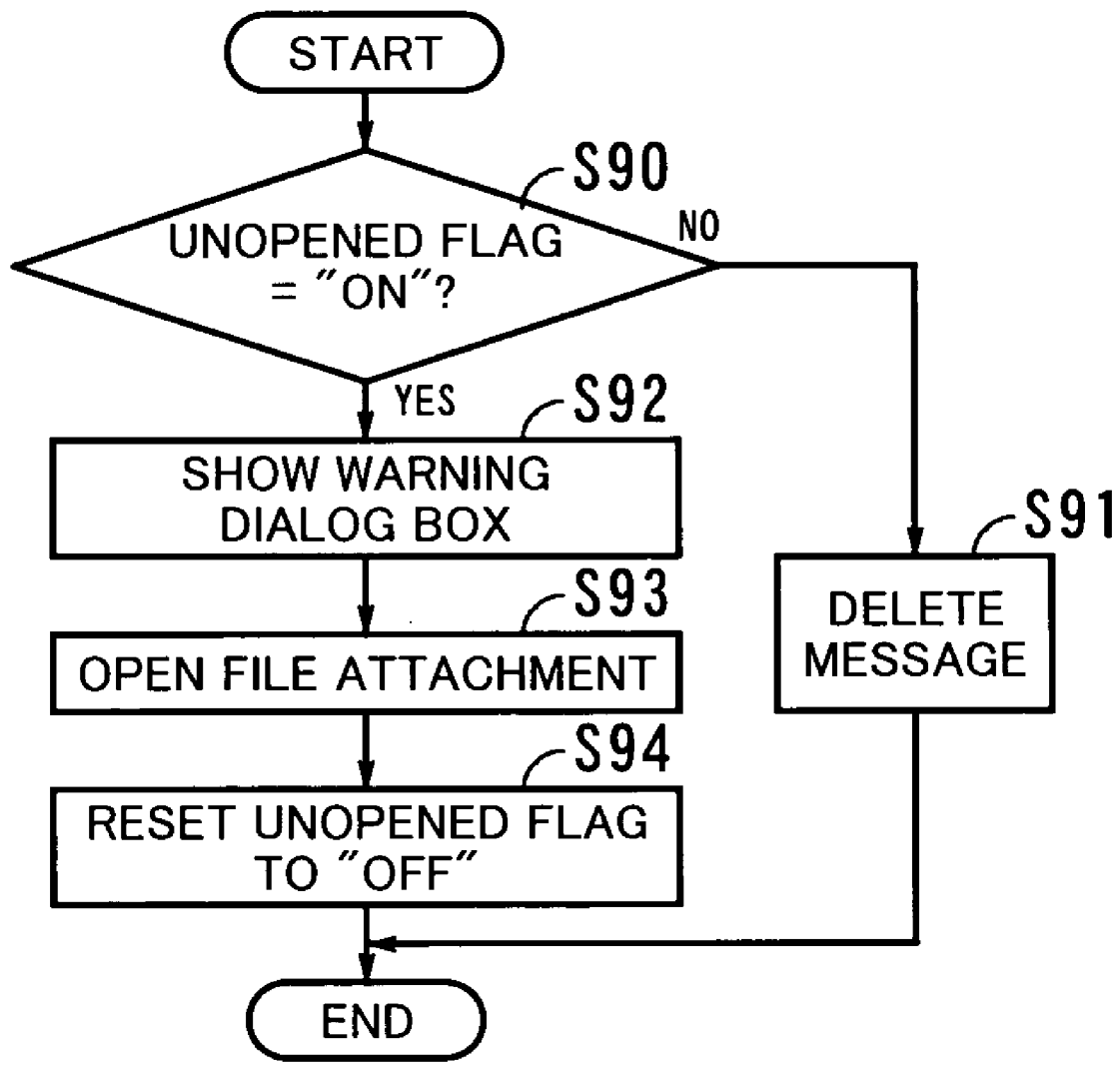
FIG. 21 is a flowchart showing a typical process to be executed when the user attempts to delete an e-mail message containing a keyword "<MUST-READ>;"

The receiving station 50 further generates a warning message if the user attempts to delete an important e-mail message without opening its file attachment. The receiving station 50 will also generate a like warning message when the mailer application program attempts to purge an e-mail message because of the expiration of its storage time limit that the inbox permits. Referring now to a flowchart of FIG. 21, the following will discuss what process will be executed in such situations. The process comprises the following steps.

(S90) The CPU 50*a* determines whether the Unopened flag of the e-mail message in question is ON. If it is, the process advances to step S92. If not, the process proceeds to step S91.

(S91) The CPU 50*a* executes a routine to delete the specified e-mail message.

Figure 22:
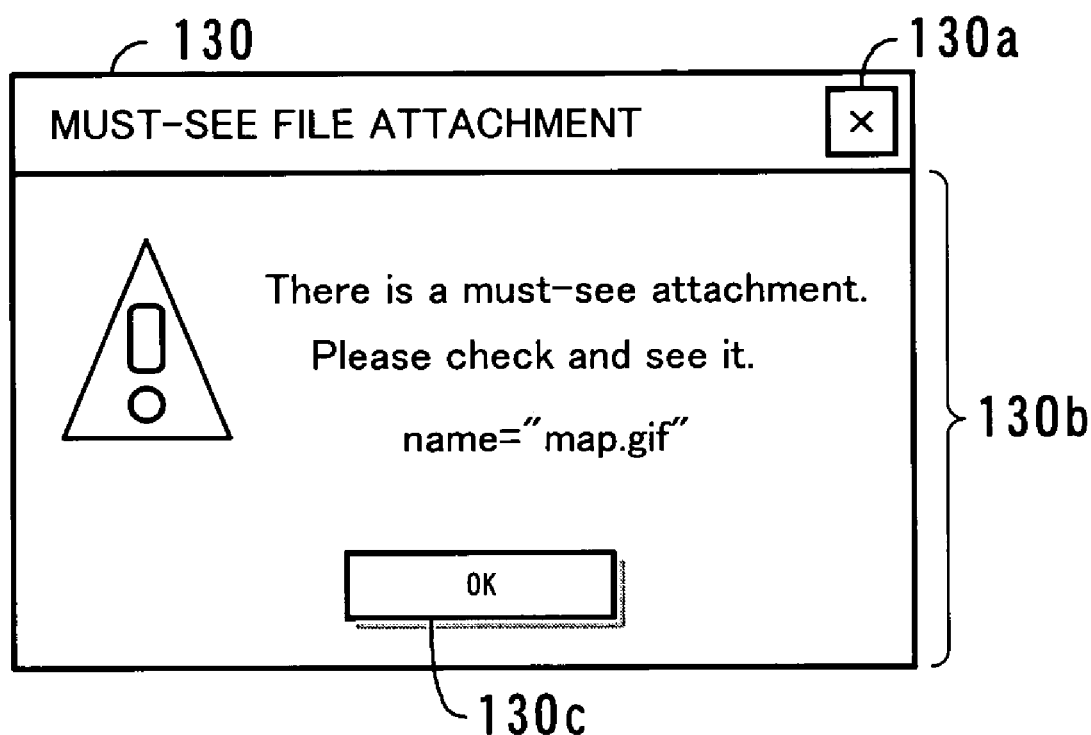
FIG. 22 is a diagram showing a typical screen that appears on the monitor unit as a result of the process of FIG. 21.

(S92) The CPU 50*a* displays a warning dialog box. FIG. 22 shows a typical layout of the warning dialog box. This dialog box 130 is titled "MUST-SEE FILE ATTACHMENT" and has a Close button 130*a* in the upper right corner for closing the dialog box 130. The pane 130*b* shows a message notifying the recipient of the presence of a file attachment, as well as suggesting that the attachment is worth opening. An OK button 130*c* is located at the bottom of the pane 130*b* to allow the recipient to acknowledge the notification.

(S93) The CPU 50*a* opens and shows the file attachment on the monitor unit 55.

(S94) The CPU 50*a* resets the Unopened flag of the message to the OFF state.

Through the above process steps, any attempt to delete an e-mail messages with an unopened must-see file attachment causes a warning dialog box, as well as opening and showing the attachment. This prevents the recipient from deleting important files accidentally.

The next section will now focus on the primitive processes of the plug-in "TickerPlugin" shown in FIG. 6. The receiving station loads and executes this plug-in when it receives an e-mail message with a must-read e-mail message. When the sender particularly wishes to call the recipient's attention, he/she inserts a composite keyword "<TICKER>" to the message's subject line to make sure that the recipient opens the message and see its file attachment.

Figure 23:
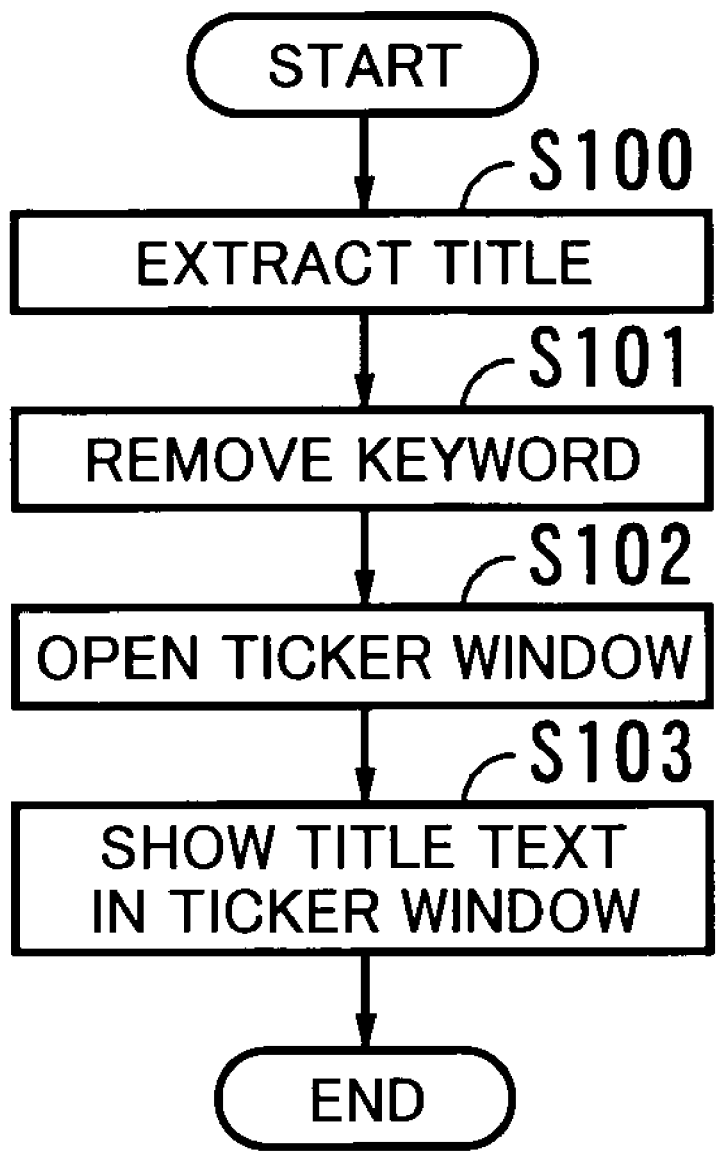
FIG. 23 is a flowchart showing a typical process to be executed when an e-mail message containing a keyword "<TICKER>" is received.

Suppose first that the receiving station 50 has received an e-mail message with a keyword "<TICKER>." FIG. 23 is a flowchart showing a process to be executed in such a situation, which comprises the following steps.

(S100) The CPU 50*a* extracts the title of the received e-mail message. One example of this is as follows.
--<TICKER>  New PC Shop Open!  East Computer Mart--

(S101) The CPU 50*a* removes the keyword from the title string obtained at step S100. In the present example, the keyword "<TICKER>" is removed from the above title string, thus yielding the following text.
-- New PC Shop Open!  East Computer Mart--

(S102) The CPU 50*a* opens a ticker window on the monitor unit 55. In the present example, it opens a new window which is large enough to accommodate the title text (i.e., without a keyword).

Figure 24:
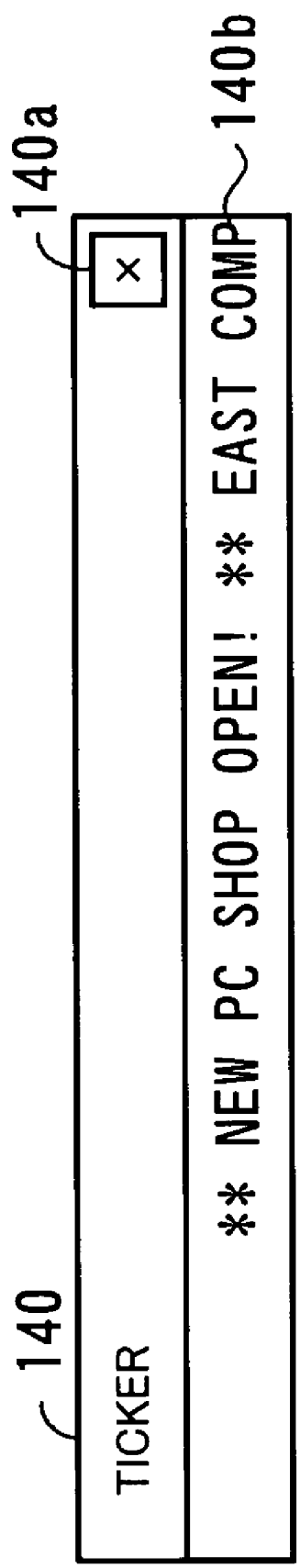
FIG. 24 is a diagram showing a typical screen that appears on the monitor unit as a result of the process of FIG. 23.

(S103) The CPU 50*a* displays the title text using what is called "ticker taping" techniques. FIG. 24 shows a typical ticker window 140 displayed on the monitor unit 55 when the above steps are executed. This ticker window 140 is titled "TICKER" and has a "Close" button 140*a* in the upper right corner for closing the window 140 itself. The pane 140*b* shows the following title text, which was obtained at step S101.

-- New PC Shop Open!  East Computer Mart--
Within the pane 140*b*, this text is displayed in "ticker" mode; i.e., it runs from right to left across the pane 140*b*.

Through the above process steps, the receiving station 50 produces a ticker window attracting the recipient's attention. This means that the sender can differentiate his/her e-mail message from others by simply adding a keyword "<TICKER>" to it. While the above example is a plain character string, the keyword may include some arguments that represent the character sizes, colors, and other properties. This expanded keyword description will permit the ticker to gain more expressive power.

The above-described preferred embodiment of the present invention has illustrated a system where the sender adds a special keyword as one of the message attributes (e.g., title), and at the receiving end, some primitive processes corresponding to the keyword are loaded and executed in response to relevant events. This mechanism provides the recipient with various services in accordance with the intention of the message. Furthermore, according to the present invention, the distributing station centrally manages primitive process description and keyword lookup table and distributes them to each receiving station. It is therefore possible to unify the behavior of receiving stations, and in addition, the definitions of primitive processes can be updated all at once, if so required.

While the above embodiment has illustrated an e-mail processing application, it is not intended to limit the present invention to this specific type of applications. Also, the location of keywords is not to be restricted to the title of a message, but alternatively, they can be inserted to the body of a message or added as part of the header of a message.

Typically, the above-described message processing mechanisms are implemented on a computer platform. The functions of a receiving station are actually realized as software functions of a computer system. Every process step can be encoded in a computer program, and such a program will be stored in a computer-readable storage medium. The computer system executes the program to provide the intended functions of the present invention.

The suitable computer-readable storage media include magnetic storage media and solid state memory devices. Some portable storage media, such as CD-ROMs (Compact Disk Read Only Memory) and floppy disks, are also suitable for circulation purposes. Further, it will be possible to distribute programs through an appropriate server computer deployed on a network. The program file delivered to a user is normally installed in his/her computer's hard drive or other local mass storage devices, which will be executed after being loaded to the main memory.

The above discussion will now be summarized as follows. The present invention proposes an improved message processing apparatus for receiving and displaying messages sent from a sending end. This message processing apparatus comprises a receiver, a key information extraction unit, a program loading unit, and an execution unit. The receiver receives a message sent from the sending end. The key information extraction unit extracts key information from each message received by the receiver. The key information is contained in the message as part of attribute data of the message, and used to identify a predetermined handler program relevant to the message. The program loading unit loads a predetermined handler program associated with the key information. The execution unit executes the predetermined handler program loaded by the loading unit at prescribed times. Configured as such, the proposed apparatus provides the recipient with appropriate processing services depending on the content of each message.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A message processing apparatus for receiving and displaying e-mail messages sent from a sending end to a receiving end, the e-mail messages having at least a header, a subject line, and a body, the apparatus comprising:
    reception means for receiving an e-mail message sent from the sending end;
    a keyword lookup table that associates predefined keywords with handler programs, the keywords representing a characteristic of the e-mail messages, such as worthiness or urgency;
    key information extraction means for examining the subject line or body of the e-mail message received by said reception means with reference to said keyword lookup table to determine whether the received e-mail message contains any one of the keywords defined in the keyword lookup table;
    program loading means, disposed at the receiving end, for consulting said keyword lookup table to load one of the handler programs that is associated with the keyword found in the received e-mail message, the handler programs including a program that displays a notification dialog box when the message processing apparatus is restarted, based on the keyword extracted by said key information extraction means; and
    execution means, disposed at the receiving end, for executing the handler program loaded by said program loading means at prescribed times.

2. The message processing apparatus according to claim 1, wherein:
    the handler program provides at least one primitive process; and
    said execution means selectively executes some of the primitive processes, depending on events that may occur subsequently to the reception of the e-mail message.

3. The message processing apparatus according to claim 1, wherein:
    the key information accompanies a predetermined argument; and
    said execution means executes the handler program, referring to the argument.

4. The message processing apparatus according to claim 1, wherein:
    the handler programs are stored in a distributing station; and
    the message processing apparatus further comprises downloading means for downloading the handler programs from the distribution station.

5. The message processing apparatus according to claim 4, wherein:
    said downloading means downloads the keyword lookup table from the distributing station, together with the handler programs.

6. A computer-readable medium storing a computer program for receiving and displaying e-mail messages sent from a sending end, the e-mail messages having at least a header, a subject line, and a body, the computer program being designed to run on a computer in order to cause the computer to function as:
    reception means for receiving an e-mail message sent from the sending end;
    a keyword lookup table that associates predefined keywords with handler programs, the keywords representing worthiness or urgency of the e-mail messages;
    key information extraction means for examining the subject line or body of the e-mail message received by said reception means with reference to said keyword lookup table to determine whether the received e-mail message contains any one of the keywords defined in the keyword lookup table;
    program loading means, disposed at the receiving end, for consulting said keyword lookup table and loading one of the handler programs that is associated with the keyword found in the received e-mail message, the handler programs including a program that displays a notification dialog box when the computer program is launched again, based on the keyword extracted by said key information extraction means; and
    execution means, disposed at the receiving end, for executing the handler program loaded by said program loading means at prescribed times.

7. A message processing apparatus for receiving and displaying e-mail messages sent from a sending end to a receiving end, the e-mail messages having at least a header, a subject line, and a body, the apparatus comprising:
    reception means for receiving an e-mail message sent from the sending end;
    a keyword lookup table that associates predefined keywords with handler programs, each of the keywords comprising a predefined symbol code and a predefined character string;
    key information extraction means for examining the subject line of the e-mail message received by said reception line of the e-mail message received by said reception means with reference to said keyword lookup table to determine whether the received e-mail message contains any one of the keywords defined in the keyword lookup table;
    program loading means, disposed at the receiving end, for consulting said keyword lookup table to load one of the handler programs that is associated with the keyword found in the received e-mail message; and
    execution means, disposed at the receiving end, for executing the handler program loaded by said program loading means at prescribed times.

8. A computer-readable medium storing a computer program for receiving and displaying e-mail messages sent from a sending end, the e-mail messages having at least a header, a subject line, and a body, the computer program being designed to run on a computer in order to cause the computer to function as:
    reception means for receiving an e-mail message sent from the sending end;

a keyword lookup table that associates predefined keywords with handler programs, each of the keywords comprising a predefined symbol code and a predefined character string;

key information extraction means for examining the subject line of the e-mail message received by said reception means with reference to said keyword lookup table to determine whether the received e-mail message contains any one of the keywords defined in the keyword lookup table;

program loading means, disposed at the receiving end, for consulting said keyword lookup table and loading one of the handler programs that is associated with the keyword found in the received e-mail message; and execution means, disposed at the receiving end, for executing the handler program loaded by said program loading means at prescribed times.

* * * * *